(12) United States Patent
Tanaka et al.

(10) Patent No.: US 7,671,962 B2
(45) Date of Patent: Mar. 2, 2010

(54) SPACER FORMING METHOD AND SPACER FORMING APPARATUS

(75) Inventors: Yasuzo Tanaka, Chigasaki (JP); Masao Murata, Chigasaki (JP); Junpei Yuyama, Chigasaki (JP); Hiroshi Koshina, Chigasaki (JP); Hiroto Uchida, Chigasaki (JP); Koji Hane, Chigasaki (JP); Takanori Tsuji, Chigasaki (JP); Mitsuru Yahagi, Chigasaki (JP)

(73) Assignee: Ulvac, Inc., Kanagawa (JP)

( * ) Notice: Subject to any disclaimer, the term of this patent is extended or adjusted under 35 U.S.C. 154(b) by 889 days.

(21) Appl. No.: 10/586,064

(22) PCT Filed: Oct. 18, 2005

(86) PCT No.: PCT/JP2005/019114

§ 371 (c)(1),
(2), (4) Date: Jul. 14, 2006

(87) PCT Pub. No.: WO2006/043545

PCT Pub. Date: Apr. 27, 2006

(65) Prior Publication Data

US 2007/0285609 A1    Dec. 13, 2007

(30) Foreign Application Priority Data

Oct. 19, 2004  (JP) .......................... 2004-303701
Mar. 24, 2005  (JP) .......................... 2005-087199

(51) Int. Cl.
*G02F 1/1339* (2006.01)
*B41J 29/38* (2006.01)

(52) U.S. Cl. ...................... 349/156; 349/155; 349/187; 347/9

(58) Field of Classification Search ................. 349/155, 349/187, 189, 190, 191, 156, 157; 347/9
See application file for complete search history.

(56) References Cited

U.S. PATENT DOCUMENTS

| 7,102,722 B2 * | 9/2006 | Kim et al. ................... 349/155 |
| 2003/0076457 A1 * | 4/2003 | Sohn et al. .................. 349/106 |
| 2003/0210311 A1 * | 11/2003 | Kim et al. ................... 347/102 |
| 2003/0214620 A1 * | 11/2003 | Kim et al. ................... 349/155 |
| 2007/0285609 A1 * | 12/2007 | Tanaka et al. ............... 349/156 |
| 2009/0009709 A1 * | 1/2009 | Niiya .......................... 349/156 |

FOREIGN PATENT DOCUMENTS

| JP | 11-24083 A | 1/1999 |
| JP | 11-024083 A | 1/1999 |

(Continued)

*Primary Examiner*—Brian M Healy
(74) *Attorney, Agent, or Firm*—Carothers & Carothers

(57) ABSTRACT

Providing a spacer forming method by which spacers can be securely formed in a predetermined region on a substrate. Ink containing granular spacers is jetted onto a crossing portion of a black matrix 5 in the shape of a lattice. Red pixel R, green pixel G and blue pixel B are formed in the openings of the lattice. The spacer containing ink is jetted onto the spacer forming positions from the nozzle by the ink jetting method. Plural drops of ink 7 are jetted onto each of the spacer forming positions on one of the opposite substrates E. The gap between the opposite substrates E can be securely maintained at a constant for filling with liquid crystal.

10 Claims, 15 Drawing Sheets

FOREIGN PATENT DOCUMENTS

| | | |
|---|---|---|
| JP | 11-316380 A | 11/1999 |
| JP | 2001-83528 A | 3/2001 |
| JP | 2001-188235 A | 7/2001 |
| JP | 2003-91010 A | 3/2003 |
| JP | 2003-270640 A | 9/2003 |
| JP | 2004-37855 A | 2/2004 |
| JP | 2004-94194 A | 3/2004 |
| JP | 2004-109856 A | 4/2004 |
| JP | 2004-145088 A | 5/2004 |
| JP | 2004-145090 A | 5/2004 |
| JP | 2004-170537 A | 6/2004 |

* cited by examiner 1 substrate 1 substrate 1 substrate

SPACER FORMING METHOD AND SPACER FORMING APPARATUS

BACKGROUND OF THE INVENTION

This invention relates to a spacer forming method and a spacer forming apparatus for maintaining a constant gap to be filled with liquid crystal between opposite substrates to be used for a liquid crystal panel, and more particularly to a spacer forming method and a spacer forming apparatus for dropping ink dispersing spacers in solvent onto spacer forming positions by an ink jet method (or drop discharging method).

Response, contrast and view angle required for a liquid crystal panel depend considerably on the thickness of the liquid crystal layer. Accordingly, the thickness thereof is so controlled to be constant by interposing spacers between the opposite substrates. In the known spacer forming method, the spacer is formed pillar-like on the substrate or ball-like spacers are scattered on the substrate.

A photolithography process or etching process is required for forming the pillar-like spacers. The number of steps is large. The cost is high and the manual labor is considerable. A spraying method (Wet type) and a granular spacer dispersing method (Dry type) are used for forming the ball-like spacer with pressurized nitrogen gas. In both of the methods, spacers are dispersed also on the region of the pixels that causes lowering of the brightness and irregularity of the latter. The spacer distribution is nonuniform and the gap between the opposite substrates is sometimes nonuniform.

In the patent literature 1, such a technique is disclosed wherein ink is simply jetted onto a black matrix as a non-pixel region. In this method, ink with granular spacers dispersed in solvent is dropped onto the black matrix from a nozzle. The solvent is evaporated and the spacers remain on the black matrix.

When the nozzle is clogged or a nozzle plate having nozzle openings is damaged thereby causing discharging trouble, spacers are not formed on the corresponding positions or the spacer forming positions are disordered. The thickness of the liquid crystal layer becomes uneven. The display quality is deteriorated. For example, when the nozzles of No. 8 and No. 17 as shown in FIG. 17 are defective in rows, spacer defects occur in the rows as shown by white circles.

The patent literature 2 discloses the a method of preventing a spacer forming defect due to abnormal spacer jetting. In that method, the ink jetted from the nozzle is observed with a camera or picture processing apparatus to measure the jetting speed of the ink and the jetting direction of the ink. When the measuring results are out of the predetermined range, the nozzle is judged to be abnormal and the nozzle is cleaned.

Patent Document 1: JP7-118835A
Patent Document 2: JP2000-17440A

PROBLEM TO BE SOLVED BY THE INVENTION

In the ink jetting method, the liquid spreads wider corresponding with the drop amount of the ink. The jetting position shift from the predetermined position causes projection of ink from the black matrix. Error of several micrometers to several tens of micrometers is sometime made on the jetting position in the ink jetting method. It might invade the pixel or the spacer might be formed on the pixel. The solvent has a bad influence on the display quality. It is preferable that the amount of the ink is less in consideration of the spreading on the substrate. However, when the amount of ink is too small, there is the fear that no spacer (granular) is included in the drop of ink.

The dispersion density of the spacer is considered to be increased to make one drop surely include the spacer. However, the fluidity varies with the density. The granular spacers might aggregate together in the ink. This has a bad influence on the ink jetting performance of the nozzle. It is not preferable that the property of the ink is changed.

The cleaning operation for solving the abnormal jetting of the nozzle raises the running cost. In order to clean one or two nozzles, the apparatus is stopped. The productivity is very poor. It is very difficult to repair the nozzle which is apt to clog or is abnormal in the jetting direction having damage to the nozzle plate.

This invention has been made in consideration of the above described problem. The object of this invention is to provide a spacer forming method by which the spacers can be securely formed within a predetermined range.

Anther object of the invention is to provide a spacer forming method and a spacer forming apparatus by which all of the spacer forming positions can be jetted without cleaning of abnormal nozzles.

SUMMARY OF THE INVENTION

In the spacer forming method of the present invention plural drops of ink are jetted on each of the spacer forming positions for maintaining a constant gap to be filled with liquid crystal, between opposite substrates, granular spacers being dispersed in the ink.

In this invention, a necessary amount of ink is jetted onto one of the spacer forming positions not by one drop but by plural drops. The amount of the one drop can be smaller. The spreading can be narrowed. The ink can be jetted onto a predetermined narrow range. At least one of the plural drops contains the spacer.

The spacer on the pixel causes deterioration of the orientation and light deficiency. The display quality is much deteriorated. Accordingly, it is preferable that the spacer is formed on a non-pixel region which does not contribute directly to the display. The intersection or crossing portion of the non-pixel region is in the shape of a lattice and is relatively wide. It is preferable that the ink is dropped on the intersection. The ink invades little of the pixel.

Ink is jetted onto plural spacer forming positions with an ink jet head having plural nozzle openings. The productivity is good. While the relative positions among the nozzles and the spacer forming positions are changed, the ink may be jetted onto the spacer forming positions. Thus, at least one drop of the ink can be jetted onto the spacer forming position even when some nozzles are clogged.

According to another embodiment of the invention, the spacer forming method comprises:

a first step of checking whether nozzles are normal or not, before an ink containing spacer is jetted onto a spacer forming position;

a second step in which the ink is jetted from a normal nozzle while the ink is not jetted from an abnormal nozzle; and a third step in which relative positions between the nozzle and the spacer forming position are so changed that the spacer forming position corresponding to the abnormal nozzle is made to register with the normal nozzle and the ink is jetted onto the spacer forming position from the normal nozzle.

The spacer forming apparatus comprises an observing means for observing the jetting of the ink containing spacer; nozzle judging means for judging a normal or abnormal nozzle: and control means by which the ink is jetted from normal nozzle while ink is not jetted from abnormal nozzle; and relative positions between the nozzle and the spacer forming position are so changed that the spacer forming position corresponding to the abnormal nozzle is made to register with the normal nozzle and the ink is jetted onto the spacer forming position from the normal nozzle.

The relative positions among the nozzles and the spacer forming positions are changed and plural drops of the ink are jetted onto the spacer forming position from the normal nozzle. At least one drop of ink is jetted onto all of the spacer forming positions. No raw non-jetted spacer-forming positions exist on the substrate.

EFFECT OF THE INVENTION

In the spacer forming method, plural drops of ink containing a spacer are dropped onto each of a plural of spacer forming positions. The required number of spacers are securely formed on predetermined areas so as not to overlap the pixel. As a result, the thickness of the liquid crystal layer can be maintained at a constant. Influence of the spacer can be suppressed considerably on the display quality. The quality of the liquid crystal can be improved.

Further, according to the invention, the relative position between the nozzle and the spacer forming positions is so changed that the abnormal nozzle position is shifted from the corresponding spacer forming positions while plural drops of ink are dropped onto the corresponding spacer forming positions from normal nozzles without a cleaning operation. The productivity is raised. The placement of a defective spacer on the spacer forming positions is avoided. The gap for filling with liquid crystal can be stably maintained at a constant. As a result, the thickness of the liquid crystal layer can be maintained at a constant. Thus, good display quality can be obtained.

Figure 1:
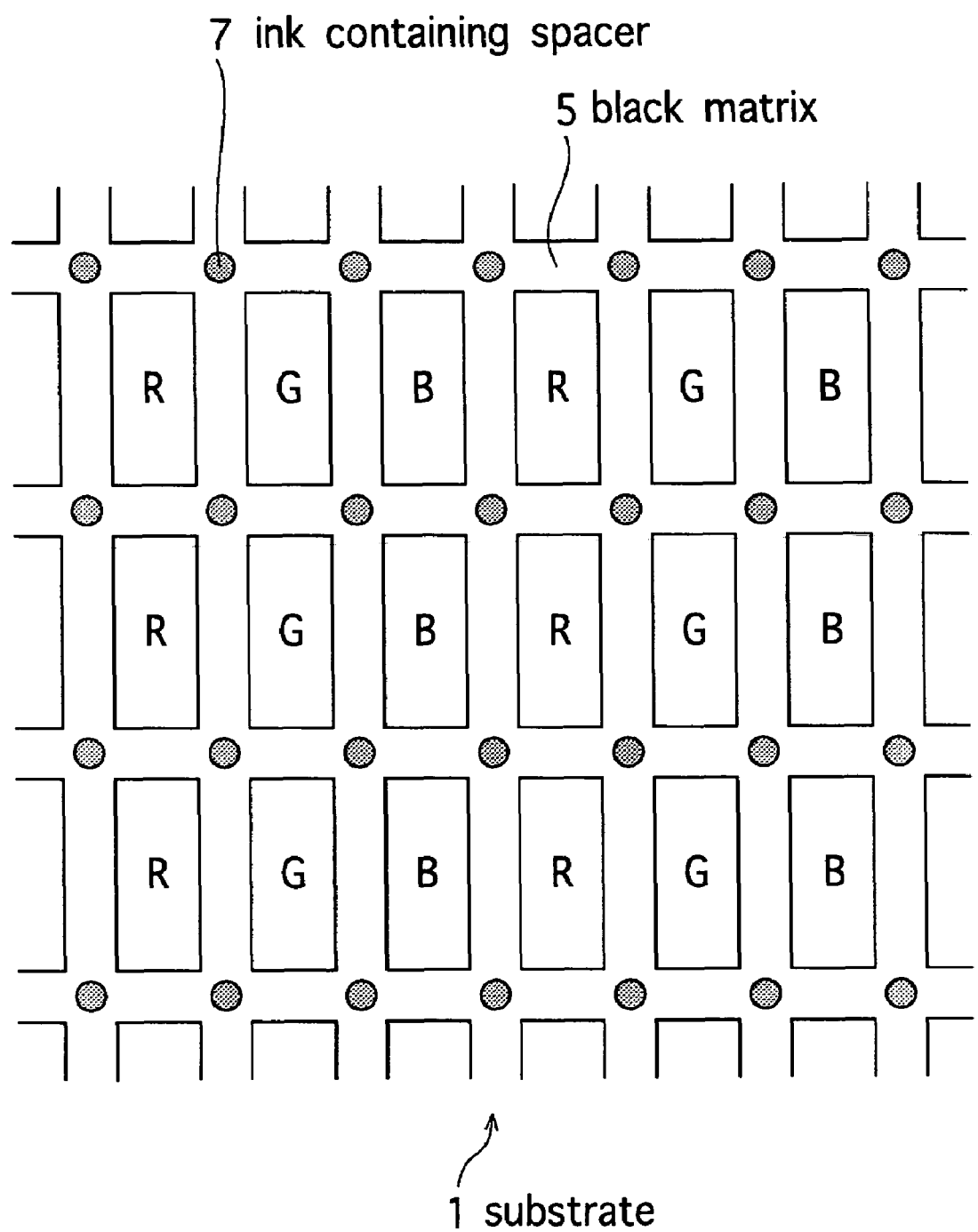
FIG. 1 is a diagrammatic plan view for explaining dropping positions (spacer forming positions) of ink containing a spacer on a substrate according to a first embodiment of this invention.

EXPLANATION OF LETTERS OR NUMERALS 1 substrate
3 ink jet head
5 black matrix
7 ink containing spacer
10 processing apparatus
11 control part
12 jetting pattern forming part
13 judging part of an abnormal nozzle
14 memory
15 observing means for observing jetting ink
n1-n9 nozzles
R red pixel
G green pixel
B blue pixel

BEST EMBODIMENT OF THE INVENTION

Next, embodiments of this invention will be described with reference to the drawings. This invention is not limited to the embodiments, but various modifications are possible on the basis of the technical concept of this invention.

First Embodiment

A gap of about several micrometers between opposite substrates is filled with liquid crystal, in a liquid crystal panel. A light polarizing plate, a color filter, opposite electrodes, and an alignment film are arranged on one glass substrate of the opposite substrates. A light deflecting plate, pixel electrodes, drive transistors and the alignment film are arranged on the other glass substrate in the other of the opposite substrates.

Seal material is coated on the one substrate. The substrates are attached to each other, facing the alignment films to each other. Spacers are formed on the other substrate.

Normally spacers are formed on the color filter side substrate with a color filter. As shown in FIG. 1, it has a black matrix 5 of lattice shape, red pixel R, green pixel G, and blue pixel B in openings of the lattice. The red pixel R, green pixel G, and blue pixel B are rimmed with the black matrix 5 which always intercepts the back light regardless of ON/OFF of voltages applied to the liquid crystal cell.

The ink contains the spacer (granular). The spacer ink 7 is dropped onto plural crossing areas (spacer forming positions) of the black matrix 5 by the ink jetting method. Crossing areas of a black matrix of the other substrate correspond to those of the one substrate.

The spacer ink 7 includes solvent such as water or alcohol and granular spacers dispersed in the solvent which are ball-like plastic glass and silica of 4 to 5 µm in diameter. The diameter corresponds to the gap filled with liquid crystal between the substrates. The viscosity, fluidity, volatility and spacer dispersion density of the ink are so adjusted as to be suitable to dropping of ink by ink jetting method.

Figure 2:
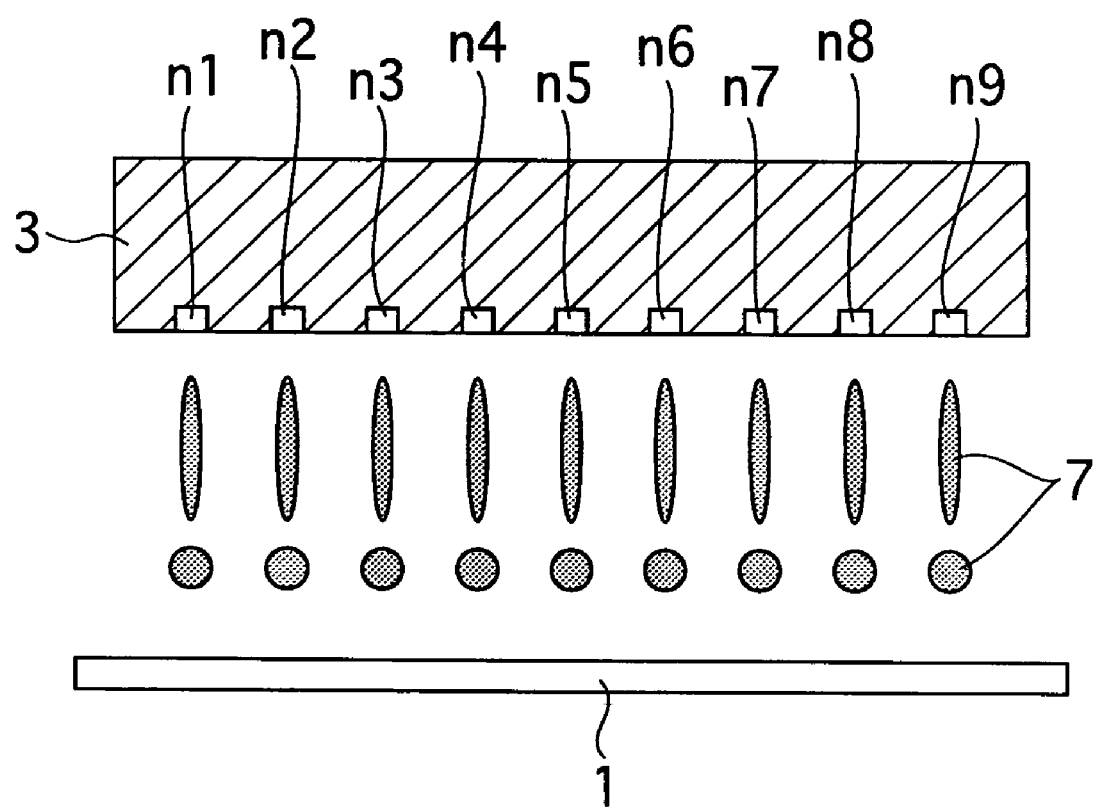
FIG. 2 is a cross sectional schematic view for explaining dropping of ink onto a substrate from nozzles of an ink jet head.

As shown in FIG. 2, the spacer ink 7 is dropped onto spacer forming positions at the same time from the nozzles n1 to n9 of the ink jet head 3 onto the nine spacer forming positions on the substrates.

Solvent is naturally evaporated or evaporated by heating and the spacers remain on the spacer forming positions. Solvent is gradually evaporated from the circumferential portion of the drop which is concentrically reduced to the center. Thus, the spacer is formed near on the center of the drop.

According to the embodiment, the ink of amount necessary for forming the spacer is not dropped at once but plural drops of ink are dropped onto the spacer forming position. In contrast to the prior art, the amount of the ink for one drop is reduced. Thus, the spread of the ink is narrowed. The spacer can be formed within the crossing position of the black matrix 5. The spacer is prevented to be formed or overlapped on the red pixel R, green pixel G, and blue pixel B, and so the display quality can be prevented from being lowered.

The dropping interval between the subsequent drops depends on the volatility of the solvent and ambient conditions. The next drop is jetted onto the dry drop after solvent is evaporated, or it is jetted onto the wet drop before the solvent is evaporated.

Although the drop may be jetted onto the line portion of the black matrix 5, it is preferable that the drop is jetted onto the crossing portion, because it is relatively wide and it dose not overlap on the pixel. TFT (Thin Film Transistor) may be formed on the crossing portion for driving a liquid crystal shutter.

The spacers are not required to always be on all of the crossing portions of the black matrix 5 to maintain a uniform gap between the opposite substrates. However, the required numbers of the spacers depend on the size of the substrate.

According to this embodiment, the mean amount of the ink 7 for one drop is equal to 5.5 pl and the mean number of the spacers contained in one drop of ink is equal to 1.3. It is preferable that it is equal to less than 10 pl so that the spacer or the drop is securely limited within the range of the crossing portion of the black matrix 5 or does not overlap the pixel. However, when the amount of the ink is too small, it is feared that the ink may contain no spacer. Accordingly, it is preferable that the amount of the ink is equal to more than 5 pl.

Figure 4:
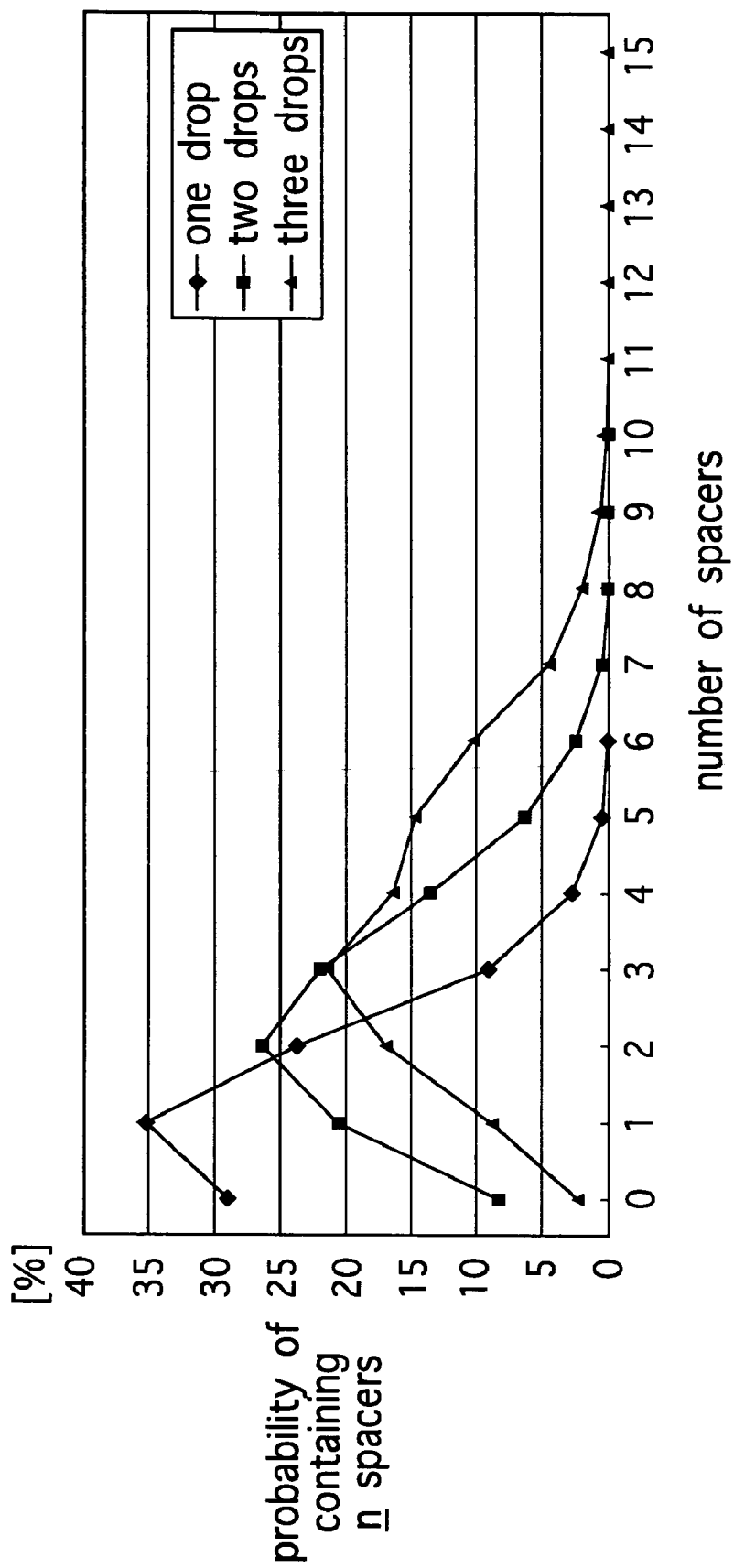
FIG. 4 is a graph showing the relationship between the probability of containing the spacers of the number n and the number n of the spacers included in one drop, two drops and three drops, respectively.

FIG. 4 is a graph for showing the probability of the ink containing the number n of spacers for one, two and three drops of ink 7 onto the same forming position. It is the probability (Y axis-percentage) that the dropped ink contains the number n of the spacers (granular) represented on the X axis. The amount of the one drop of ink is equal to about 5.5 pl.

According to the graph, the probability is equal to about 29% that one drop contains 0 spacers or no spacer. The probability that two drops contains 0 spacers or no spacer is equal to less than 10%. The probability that three drops contains 0 spacers or no spacer is equal to less than 2%.

The amount of ink of the same kind as the prior art for one drop is smaller than that of the prior art, so as to reduce the spreading of the dropped ink. Accordingly, the probability that one drop of ink contains no spacer, is higher than the prior art. However, the probability can be reduced with the number of drops as shown in FIG. 4. Thus, the spacers can be securely formed on the spacer forming positions.

Second Embodiment

Next, a second embodiment of this invention will be described with reference to the drawings. Parts that correspond to those in the above first embodiment, are denoted by the same reference numerals, and the detailed description of which will be omitted.

In the ink jetting method, the ink containing spacer is dropped onto a very narrow region. Accordingly, the diameter of the nozzle is very small. The nozzle is apt to be clogged with ink. The ink is not discharged from the clogged nozzle. Even when plural drops are so designed as to be jetted from the same nozzle, no spacer is formed on the corresponding spacer forming positions by the clogged nozzle.

Figure 3:
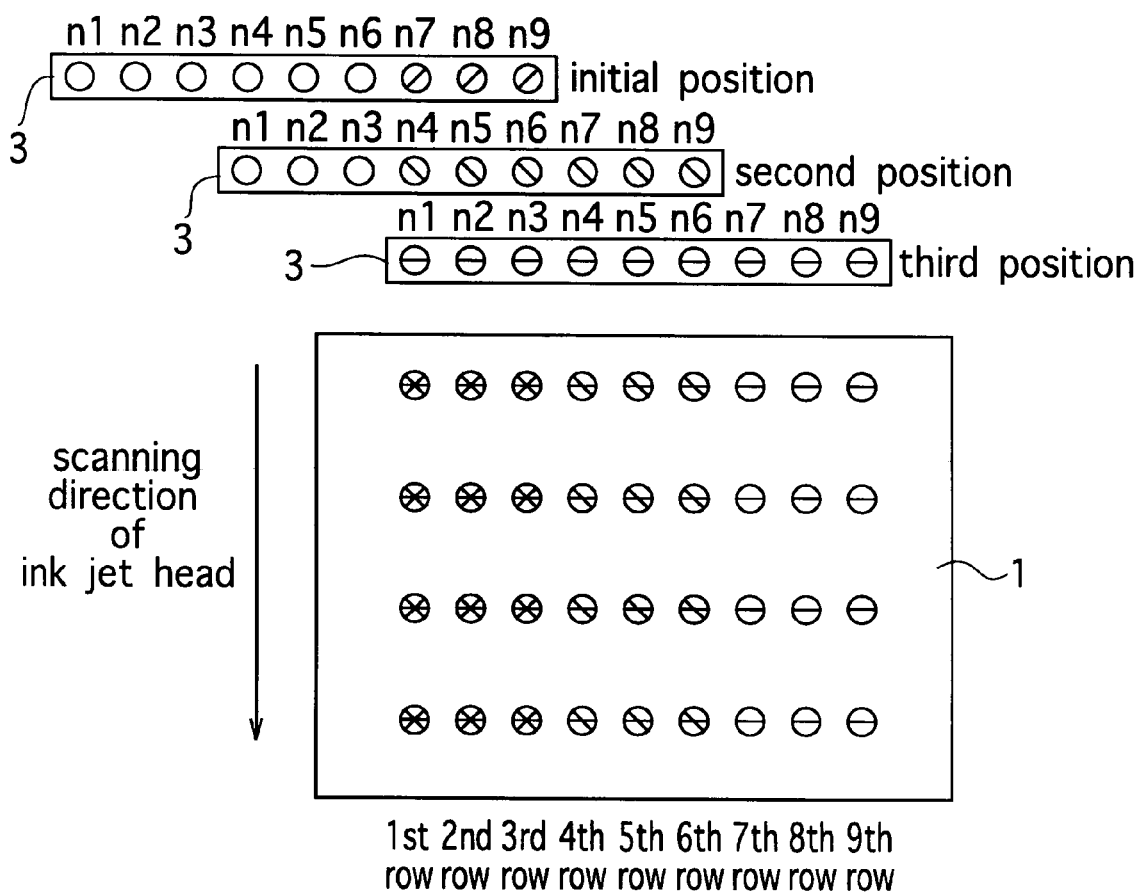
FIG. 3 is a schematic plan view showing a spacer forming method according to a second embodiment of this invention.

According to this embodiment, the relative position between the nozzle and the corresponding spacer forming position, is shifted every drop so that plural drops of ink are not repeatedly jetted onto the one spacer forming position from the same nozzle as shown in FIG. 3.

First, the nozzles n7, n 8 and n9 are so positioned that the first row of the spacer forming positions, the second row of the spacer forming positions and the third row of the spacer forming positions register with the nozzles n1, n2 and n3, which are arranged in line, in this order (the initial position or the first position). The ink jet head 3 is scanned in the direction as shown by the arrow. From the nozzle n7, the spacer containing ink 7 is jetted onto the first row of the spacer forming positions. From the nozzle n8, the spacer containing ink 7 is jetted onto the second row of the spacer forming positions. From the nozzle n9, the spacer containing ink 7 is jetted onto the third row of the spacer forming positions.

The numbers of the nozzles, lines and rows of the spacer forming positions are not limited to the numbers shown in FIG. 3. Those are one example. The ink jet head 3 is so designed to be movable in the scanning direction as shown by the arrow. Instead, the substrate 1 may be movable in a direction opposite to the arrow.

Next, by length of three nozzles from the initial position, the ink jet head 3 is shifted rightward in the line direction. The nozzles n4, n5, n6, n7, n8 and n9 are so positioned as to register with the spacer forming positions of the first, second, third, fourth, fifth and sixth rows, respectively. The ink jet head 3 is moved in the scanning direction as shown by the arrow. Thus, the spacer containing ink 7 is jetted onto the first row of the spacer forming positions, from the nozzle n4. The spacer containing ink 7 is jetted onto the second row of the spacer forming positions, from the nozzle n5. The spacer containing ink 7 is jetted onto the third row of the spacer forming positions, from the nozzle n6. The spacer containing ink 7 is jetted onto the fourth row of the spacer forming positions, from the nozzle n7. The spacer containing ink 7 is jetted onto the fifth row of the spacer forming positions, from the nozzle n8. The spacer containing ink 7 is jetted onto the sixth row of the spacer forming positions, from the nozzle n9. The spacer containing ink 7 is jetted onto the seventh row of the spacer forming positions, from the nozzle n6. The spacer containing ink 7 is jetted onto the eighth row of the spacer forming positions, from the nozzle n7. Two drops of ink are jetted onto the first to the third rows of spacer forming positions, from the different nozzles.

Next, for the length of three nozzles from the second position to the third position, the ink jet head 3 is shifted to the right in the line. The nozzles n1, n2, n3, n 4, n5, n6, n7, n8 and n9 are so positioned to register with the spacer forming positions of the first, second, third, fourth, fifth, sixth, seventh, eighth and ninth arrows, respectively. The inkjet head 3 is moved in the scanning direction as shown by the arrow. Thus, from the nozzle 1, the spacer containing ink 7 is jetted onto the first row of the spacer forming positions. From the nozzle n2, the spacer containing ink 7 is jetted onto the second row of the spacer forming positions. From the nozzle n3, the spacer containing ink 7 is jetted onto the third row of the spacer forming positions. From the nozzle n4, the spacer containing ink 7 is jetted onto the fourth row of the spacer forming positions. From the nozzle n5, the spacer containing ink 7 is jetted onto the fifth row of the spacer forming positions. From the nozzle n6, the spacer containing ink 7 is jetted onto the sixth row of the spacer forming positions. From the nozzle n7, the spacer containing ink 7 is jetted onto the seventh row of the spacer forming positions. From the nozzle n8, the spacer containing ink 7 is jetted onto the eighth row of the spacer forming positions. From the nozzle n9, the spacer containing ink 7 is jetted onto the ninth row of the spacer forming positions.

As above described, plural drops of ink are jetted onto one spacer forming position from the different nozzles. Even when a certain nozzle is clogged, there is no fear that a drop of ink will not be jetted onto the spacer forming positions.

The manner of changing the relative position between the nozzle and the spacer forming positions is not limited to the above manner. The ink jet head 3 may be arranged along the row, and it may be scanned in the line direction. In that case, the nozzle may be shifted one drop by one drop in the row direction, or after scanning in the row direction, the ink jet head 3 is rotated by 90°, and it may be scanned in the line direction.

Third Embodiment

Next, the third embodiment of this invention will be described. Parts which correspond to those in the first embodiment of this invention, are denoted by the same reference numerals, the detailed description of which will be omitted.

The spacer containing inks 7 are jetted onto the spacer forming positions from the nozzles n1 to n9 arranged in the line of the ink jet head 3 as shown in FIG. 2. The spacers are formed on the spacer forming positions at the same time.

In this embodiment of this invention, the ink jet head 3 or the substrate 1 are relatively moved in a direction perpendicular to the nozzle arrangement line while the spacer containing inks are concurrently jetted onto the spacer forming positions. For example, the substrate 1 is moved in the direction perpendicular to the nozzle arrangement line, relative to a stationary ink jet head 3. Alternatively the ink jet head 3 is moved in the direction perpendicular to the nozzle arrangement line, relative to a stationary substrate 1 or both of them may be moved.

Next, the detailed spacer forming manner will be described.

First, before the spacer containing ink 7 is jetted onto the substrate to be manufactured, from the nozzle, it is jetted onto a dummy substrate from the nozzle for testing as to whether the nozzle is normal or abnormal. In this case, ink discharging from the nozzle is observed by the observing means for observing nozzle discharge.

The observing means consists of a laser optical system, a camera and an image processing apparatus. It is arranged on a head maintenance position. The head is moved to a discharge observing position. While the laser is blinked, the jetting ink is imaged with the camera. The ink jet track is taken up as a still image. The image is processed with the image processing apparatus. Ink jetting speed and jetting angle are calculated and whether the nozzle is abnormal or normal is judged with the calculation results. The observing means may be moved to the jetted ink for observing the jetting ink from the nozzle. When the nozzle is completely clogged the ink is not jetted from it. The jetting trace cannot be obtained as the image. The nozzle is abnormal. The ink jetting may be imaged as an animation. The jetting speed and the jetting angle can be calculated from the animation.

In judging the abnormal nozzle, thresholds for the jetting speed Vd and jetting angle θ are set at 5.0 m/sec 5% and 0.5, respectively. The test results are shown in table 1. The nozzles 8 and 17 are judged to be abnormal. No ink is jetted from nozzle 17. The jetting speed and the jetting angle 0 cannot be observed. The jetting angle θ is the angle between the line connecting the center of the nozzle and the center of the corresponding spacer forming position or the line vertical to the substrate from the center of the nozzle. The ink jetting trace inclination is the jetting angle.

TABLE 1

| Nozzle No. | Jetting Speed | Jetting Angle | Jetting Status |
|---|---|---|---|
| 1 | 5.0 m/sec. ± 5% | ±0.5° | normal |
| . | | | |
| . | | | |
| . | | | |
| 7 | 5.0 m/sec. ± 5% | ±0.5° | normal |
| 8 | 4.0 m/sec. ± 15% | ±2.5° | abnormal |
| 9 | 5.0 m/sec. ± 5% | ±0.5° | normal |
| . | | | |
| . | | | |
| . | | | |
| 16 | 5.0 m/sec. ± 5% | ±0.5° | normal |
| 17 | — | — | abnormal |
| 18 | 5.0 m/sec. ± 5% | ±0.5° | normal |
| . | | | |
| . | | | |

The jetting abnormality may be judged with the shift to the actual drop position from the predetermined point of the substrate under the center of the nozzle.

For example, the nozzles in line are photographed in the direction of the relative movement between the substrate and the ink jet head 3, with the camera. The drop position shift is equal to D×tan θ D is equal to a line connecting the center of the nozzle and the center of the spacer forming position. For example, it is equal to 0.5 mm. θ is the angle of the line to the ink jetting track.

The ink jetting is photographed in the direction perpendicular to the relative movement direction of the ink jet head 3 and substrate, with the camera. The drop shift is equal to Vs D/Vd. Here the Vs is the moving speed of the substrate to the still inkjet head 3, for example, it is equal to 200 mm/second. D and Vd are as above mentioned.

Further, the abnormal nozzle may be judged by the equation D tan θ+Vs×DN.

The ink is not jetted from the abnormal nozzle. The ink is jetted onto a substrate to be manufactured only from the normal nozzles. No voltage is applied to a piezoelectric element for driving the ink pressure tank for the abnormal nozzle. No ink is jetted from the abnormal nozzle. When the ink jet head is of the thermal type, no heat is supplied to ink containing chamber for the abnormal nozzle.

For example, the nozzles No. 8 and No. 17 are abnormal among thirty-two nozzles. Ink drops are jetted onto the substrate 1 from the normal nozzles (Nos. 1 to 7, Nos. 9 to 16 and Nos. 18 to 32), while the substrate 1 is moved in the direction as shown by the arrow perpendicular to the nozzle arrangement line. No ink is jetted from the abnormal nozzles Nos. 8 and 17. The spacer is not formed on the corresponding spacer forming positions.

Figure 5:
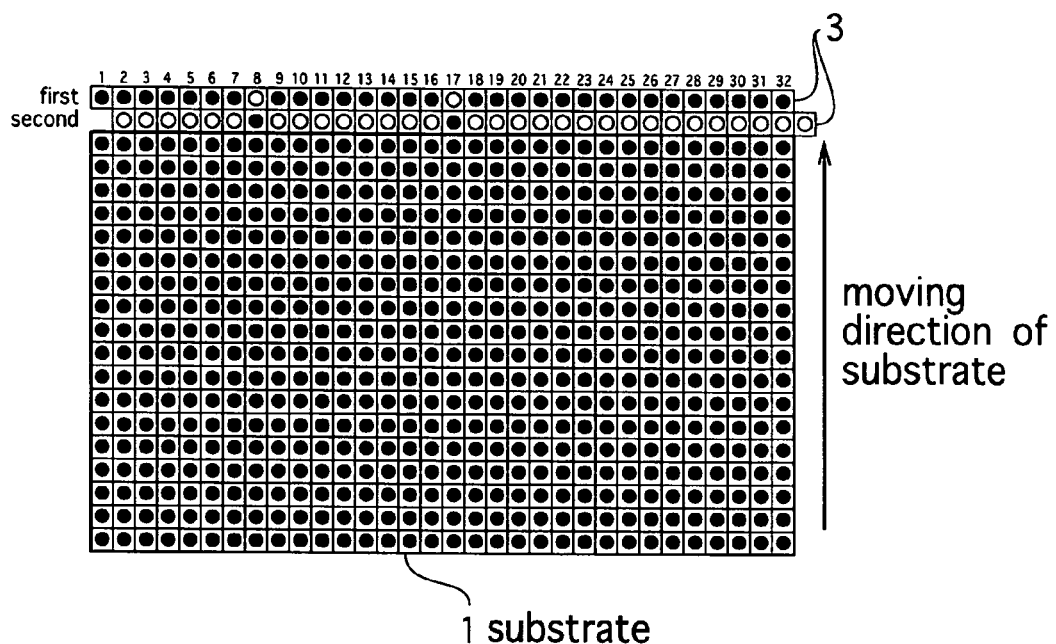
FIG. 5 is a schematic plan view of an ink jetting pattern according to a third embodiment of this invention.

Next, the ink jet head 3 is shifted to the right by the length of the nozzle in FIG. 5. The normal nozzle No. 7 registers with the spacer forming position of the 8th row and the normal nozzle No. 16 registers with the spacer forming position of the 17th row. The ink jet head 3 or the substrate 1 may be shifted one relative to the other.

In the above corresponding positions, the second ink jetting is accomplished from only the nozzles No. 7 and No. 16. No ink is jetted from the other nozzles.

As a result, one drop of ink is jetted onto all of the spacer forming positions of the rows. In FIG. 5, ● of nozzle represents the ink jetting nozzle and ○ of nozzle represents the non ink jetting nozzle. ● on the substrate represents the spacer forming positions. As described, one drop of ink is jetted onto all of the spacer forming positions. The forming of non spacer regions in the line on the substrate 1 is avoided. A desirable gap can be securely obtained between the opposite substrates for filling with liquid crystal.

Fourth Embodiment

Figure 6:
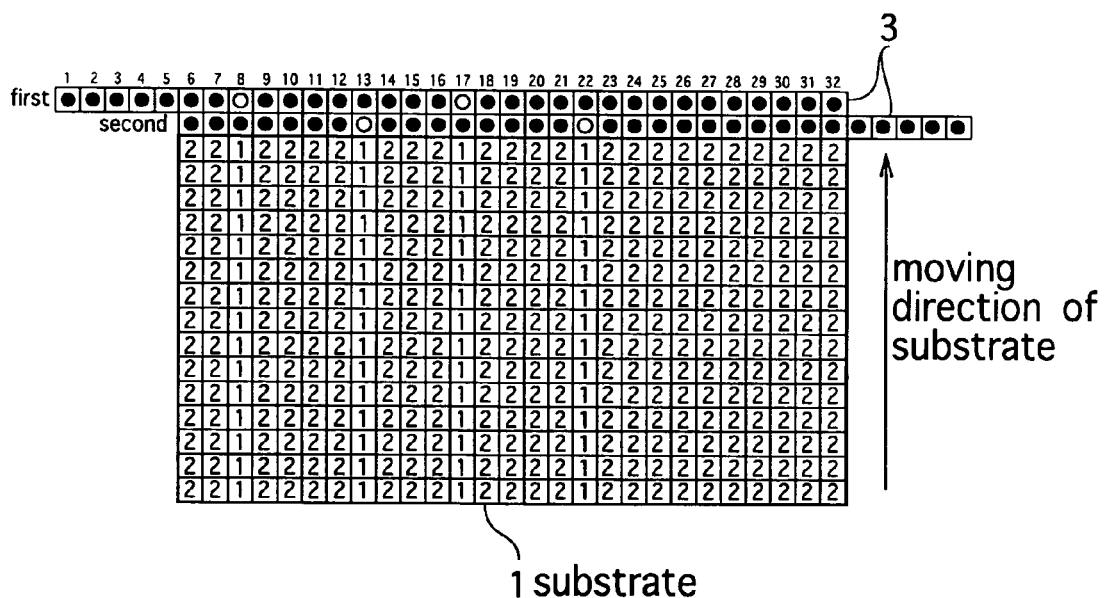
FIG. 6 is a schematic plan view of an ink jetting pattern according to a fourth embodiment of this invention

Next, the fourth embodiment of this invention will be described with reference to FIG. 6. Parts which correspond to those in the first embodiment of this invention, are denoted by the same reference numerals, the detailed description of which will be omitted. In FIG. 6, ● represents a normal nozzle and ○ represents abnormal nozzle. Numerals on the substrate 1 represent the numbers of the jetted drops on the respective spacer forming positions.

For example, in FIG. 6, the nozzles No. 8 and No. 17 are abnormal among the thirty-two nozzles. Ink drops are jetted onto the substrate 1 from the normal nozzles (Nos. 6 to 7, Nos. 9 to 16 and Nos. 18 to 32), while the substrate 1 is moved in the direction as shown by the arrow perpendicular to the nozzle arrangement line. No ink is jetted from the abnormal nozzles No. 8 and No. 17. The spacer is not formed on the corresponding spacer forming positions. In the first ink jetting, the spacer containing ink is not dropped on to the spacer forming positions of the third and twelfth rows, corresponding to the abnormal nozzles.

By the length of five nozzles, the ink jet head 3 is moved to the right. Thus, the corresponding registration is changed from the first registration. The second ink jetting is carried out on the substrate 1. The inks are jetted only from the normal nozzles Nos. 1 to 7, 9 to 16 and 18 to 27. No ink is jetted from the other nozzles.

Accordingly, the spacer forming positions registered with the normal nozzles both in the first and second ink jetting receive two drops of ink. The spacer forming positions registered with the abnormal nozzle, in the first or second ink-jetting, receive one drop of ink. None of the spacer forming positions register with the abnormal nozzle both in the first and second ink jetting. No row of non-dropped positions is formed in the line on substrates. The desirable gap can be obtained between the opposite substrates With respect to the spacer forming positions receiving two drops, the amount of ink of one drop, containing the necessary number of the spacers is reduced in comparison with the case when only one drop is jetted onto spacer forming positions, respectively. The spread of the one drop is suppressed. The spacer can be securely formed within the crossing portion of the black matrix 5. The spacer is prevented from overlapping red pixel R, green pixel G, and blue pixel B which are light-transparent and contribute to the display. The deterioration of the display can be avoided.

It is preferable that the one drop contains three to seven spacers. The number of the spacers in one drop depends on the spacer density and the drop size. There is the fear that one drop may contain no spacer or does not contain the necessary number of spacers. Accordingly, it is preferable from the above viewpoint that plural drops are jetted onto the one spacer forming position.

Fifth Embodiment

Figure 7:
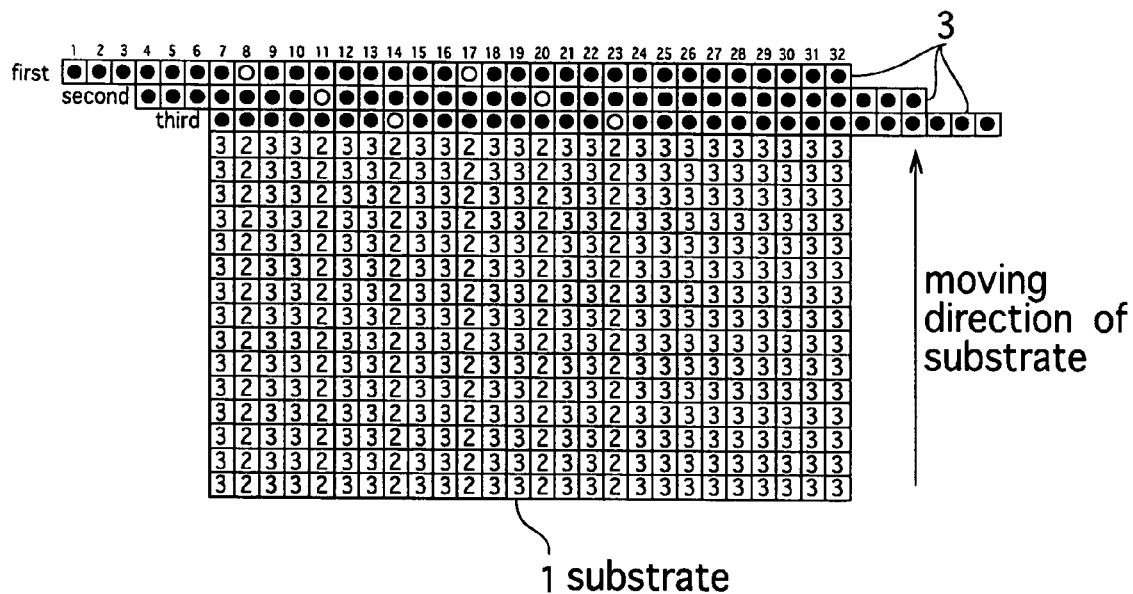
FIG. 7 is a schematic plan view of an ink jetting pattern according to a fifth embodiment of this invention.

Next, the fifth embodiment of this invention will be described with reference to FIG. 7. Parts which correspond to those in the above embodiments of this invention are denoted by the same reference numerals, the detailed description of which will be omitted. In FIG. 7, ● represents a normal nozzle and ○ represents an abnormal nozzle. Numerals on the substrate 1 represent the numbers of the jetted drops on the respective spacer forming positions.

For example, in FIG. 7, the nozzles No. 8 and No. 17 are abnormal among the thirty-two nozzles. Ink drops are jetted onto the substrate 1 from the normal nozzles (No. 7, Nos. 9 to 16 and Nos. 18 to 32), while the substrate 1 is moved in the direction as shown by the arrow perpendicular to the nozzle arrangement line. No ink is jetted from the abnormal nozzles No. 8 and No. 17. The spacer is not formed on the corresponding spacer forming positions. In the first ink jetting, the spacer containing ink is not dropped onto the spacer forming positions of the second and eleventh rows, corresponding to the abnormal nozzles.

Next, the ink jet head 3 is shifted to the right in FIG. 7 by the length of three nozzles. Thus, the corresponding relation is changed from the first relation. The second ink jetting is carried out on the substrate 1. The inks are jetted only from the normal nozzles Nos. 4 to 7, Nos. 9 to 16 and Nos. 18 to 29. No ink is jetted from the other nozzles.

Next, the ink jet head 3 is shifted to the right in FIG. 7 by the length of three nozzles. Thus, the corresponding relation is changed from the second relation. The third ink jetting is carried out on the substrate 1. The inks are jetted only from the normal nozzles Nos. 1 to 7, 9 to 16 and 18 to 26. No ink is jetted from the other nozzles.

Corresponding to the normal nozzles in the first, second and third ink jetting, the three drops of ink are jetted onto the spacer forming positions. When the abnormal nozzle registers with any one of the first, second and third ink jetting, two drops of ink are jetted onto the corresponding spacer forming position. Also in this embodiment, the corresponding position between the abnormal nozzle and the spacer forming position is changed. No spacers are formed in line. The desirable gap can be obtained between the opposite substrates.

Plural drops of ink are jetted onto all of the spacer forming positions. The amount of the one drop of ink can be reduced. The spread of ink is suppressed. The spacer can be limited within the range of the crossing portion of the black matrix 5.

The probability can be reduced that the dropped ink contains no spacer or the number of spacers is less than necessary.

Sixth Embodiment

Figure 8:
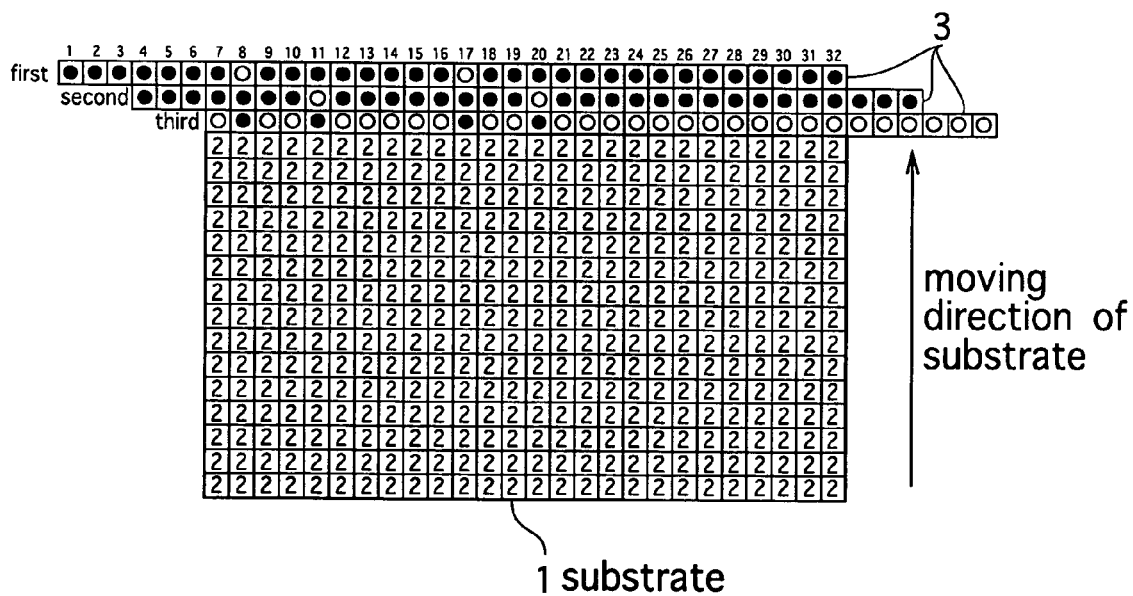
FIG. 8 is a schematic plan view of an ink jetting pattern according to a sixth embodiment of this invention.

Next, the sixth embodiment of this invention will be described with reference to FIG. 8. Parts which correspond to those in the above embodiment of this invention, are denoted by the same reference numerals, the detailed description of which will be omitted. In FIG. 8, ● represents a normal nozzle in the first and second ink jetting positions and ○ represents an abnormal nozzle. ● represents the ink-jetting normal nozzle in the third ink jetting position and ○ represents the non-jetting normal or abnormal nozzle in the third ink-jetting position. Numerals on the substrate 1 represent the numbers of the jetted drops on the respective spacer forming positions.

In FIG. 8, the ink is not jetted from the abnormal nozzles No. 8 and No. 17. The ink is jetted onto the substrate 1 from the normal nozzles No. 7, Nos. 9 to 16 and Nos. 18 to 32.

Next, the ink jet head 3 is shifted to the right by the length of the three nozzles in FIG. 8. The relative positions of the abnormal nozzles to the spacer forming positions are changed from the first ink jetting position. The ink is jetted onto the substrates from the normal nozzles Nos. 4 to 7, Nos. 9 to 16 and Nos. 18 to 29. No ink is jetted onto the substrate 1 from the other nozzles.

Further, the ink jet head 3 is shifted to the right by the length of the three nozzles from the second ink jetting position, The relative position of the abnormal nozzles to the spacer forming positions is changed from the second ink jetting position. The third ink jetting is carried out by the normal nozzles Nos. 2, 5, 11 and 14. No ink is jetted from the other nozzles.

As a result, the two drops of ink are jetted onto all the spacer forming positions. The distribution of the number of the spacers is made to be uniform on the substrate 1. Thus, the gap for filling liquid crystal can be more securely obtained between the opposite substrates.

Plural drops of ink are jetted onto all of the spacer forming positions. The amount of the one drop of ink can be reduced. The spread of ink is suppressed. The spacer can be limited within the range of the crossing portion of the black matrix 5. The probability can be reduced that the dropped ink will contain no spacer or the number of spacers is less than necessary.

Seventh Embodiment

Next, the seventh embodiment of this invention will be described with reference to FIG. 9. Parts which correspond to those in the above embodiments of this invention, are denoted by the same reference numerals, the detailed description of which will be omitted.

Figure 9:
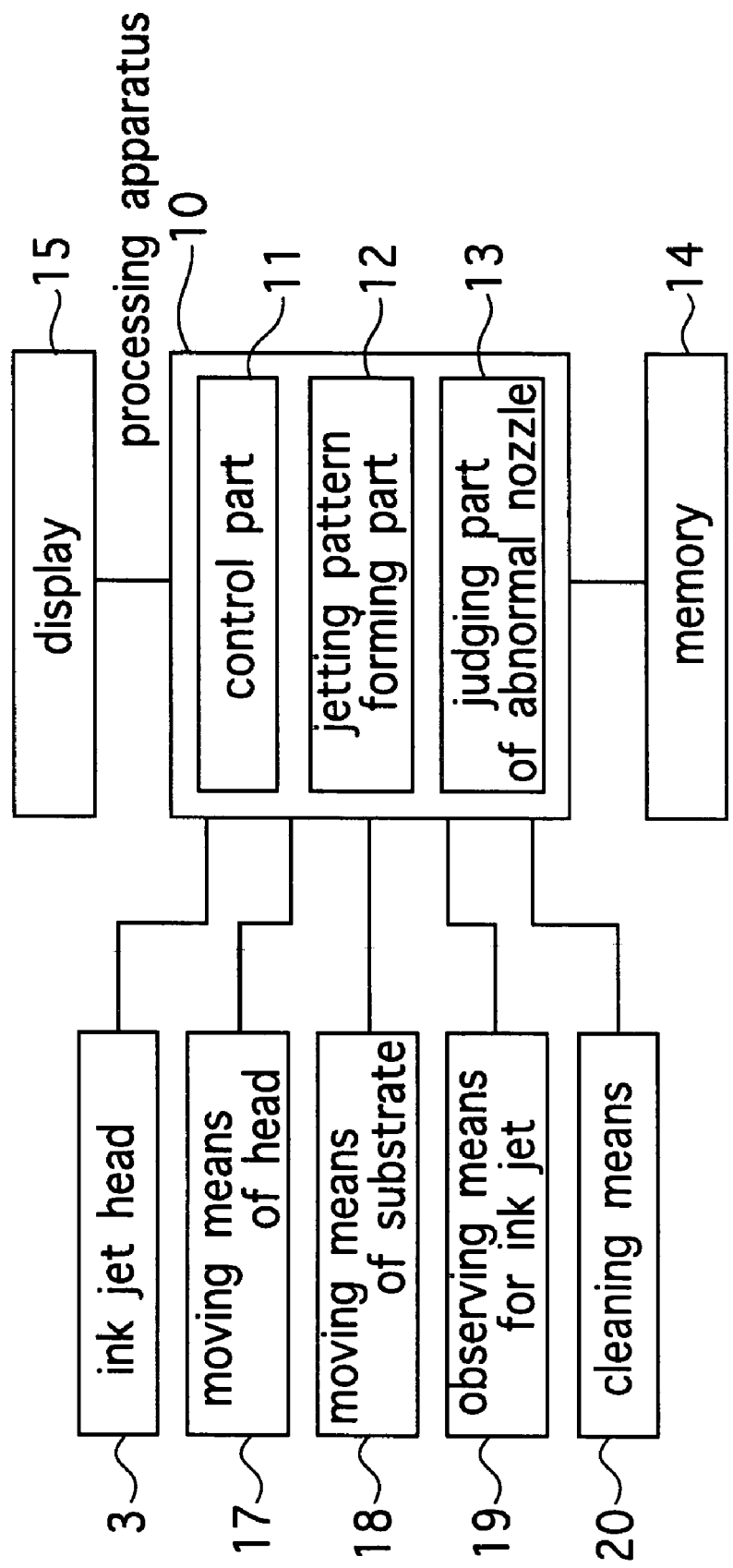
FIG. 9 is a block diagram of a spacer forming apparatus according to a seventh embodiment of this invention.

FIG. 9 shows a block diagram of a spacer forming apparatus according to this embodiment. It consists of the ink jet head 3 having plural nozzles arranged in line (refer to FIG. 2), head moving means 17 for moving the ink jet head 3, a substrate moving means 18, jetting observing means 19, cleaning means 20, memory device 14, a display 15 and processing apparatus 10 connected to them.

The head moving means 17 is driven for example by a step motor or piezoelectric motor and the ink jet head 3 is moved in a direction parallel to the nozzle arrangement. The substrate moving means 18 moves a stage supporting the substrate 1 in a direction (scanning direction) perpendicular to the nozzle arrangement. Jetting observing means 19 consists of the laser optical system, the camera and the picture processing apparatus. The memory device 14 is, for example, semiconductor memory and a magnetic disc to record to memory the abnormal nozzle position. The processing apparatus 10 includes a control part 11, and a calculating part (jetting pattern making part 12 and nozzle abnormality judge part 13).

An X-Y stage movable in two directions perpendicular to each other may be used for all of the above embodiments. Alternatively the head moving means may be movable in two directions perpendicular to each other with the X-Y stage.

Figure 10:
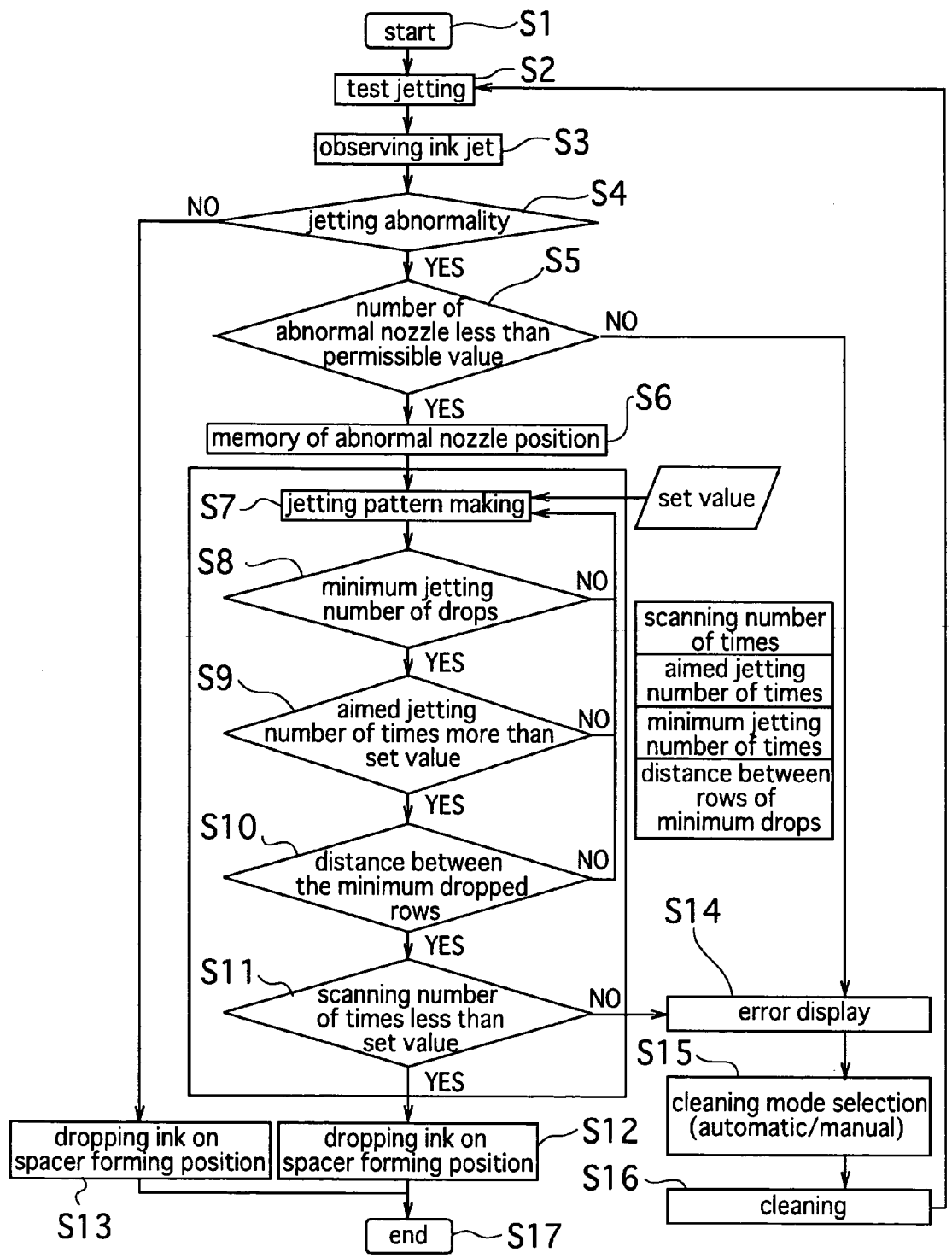
FIG. 10 is a flow chart showing flow of a spacer forming method according to the seventh embodiment of this invention

Next, a spacer forming method will be described with reference to the flow chart of FIG. 10.

First, flow starts at step S1 and the test jetting is generated at step S2. The test jetting is observed by the jetting observing means 19 (step S3). The observing data such as jetting speed, and jetting angle is transmitted from the jetting observing means 19 to the processing apparatus 10. The jetting abnormal nozzle is judged by the judging part 13 in the processing apparatus 10.

When, a result of the judgment, it is judged that there is no abnormal nozzle, "NO" is issued from step S4. The ink is jetted from all the nozzles registered with the spacer forming positions (step S13). The flow ends (step S17). One drop or plural drops are jetted onto the corresponding spacer forming positions.

When there is an abnormal nozzle, "YES" is issued at step S4. At the step S5, it is judged whether the number of the abnormal nozzles is less than the permissible number, or not. When the number of the abnormal nozzles is too large, NO is issued at step S5 and "Error" is displayed at the display 15 (step S14). A cleaning mode is selected automatically or manually at step S15. The nozzle is cleaned by the cleaning means 20 at step S16.

When the number of the abnormal nozzles is less than the permissible, "YES" is issued at step S5. The positions of the abnormal nozzles are memorized by the memory device 14 at step S6. For example, in the above embodiment, No. 8 and No. 17 are memorized as the abnormal nozzle.

The jetting pattern making part 12 makes a jetting pattern on the basis of the position of the abnormal nozzle and various set values such as the number of scanning times, number of jetting aimed times, number of jetting minimum times, and the minimum distance between the jetting lines. FIG. 11 to 16 show examples of the jetting patterns. The number of scanning times is the number of the repeated scanning strokes of the inkjet head 3 or the substrate in the direction perpendicular to the nozzle arrangement. The number of jetting aimed times is the aimed number of drops for the one spacer forming position. The number of minimum jetting times is the number of drops for the spacer forming position which does not receive the aimed number of drops because of the abnormal nozzle. The minimum distance between the rows is the distance permissible between the rows which do not receive the aimed number of drops. When the rows are adjacent to each other, the distance is equal to zero. The permissible number of the rows which receive the number of drops less than the aimed number, may be set in the control part 11 as a set value.

In FIG. 11 to 16, ○ represents the normal nozzle which does not jet ink. ◉ represents the normal nozzle which jets ink. ● represents the abnormal nozzle which does not jet ink. The numbers of the drops are shown only in one line along the nozzle arrangement for the spacer forming positions.

It is judged whether the jetting pattern made at step S7 fulfils the above determined conditions, at steps S8 to S11. When the above conditions are not fulfilled, the jetting pattern is remade at step S7. When the condition of the scanning number of times is not fulfilled, "NO" is issued at step S11 because the increase of the scanning number of times lowers the productivity. "Error" is displayed at the display 15 (S14). The cleaning mode is selected automatically or manually at step S15. The nozzles are cleaned by the cleaning means at step S16.

When the jetting pattern made at step S7, fulfills the requirements of the conditions of steps S8 to S11, the control part 11 controls the movement of the substrate or the ink jet head 3 and the nozzles to jet the ink. The ink is jetted onto spacer forming positions at step S12. And the flow ends at step S17.

Figure 11:
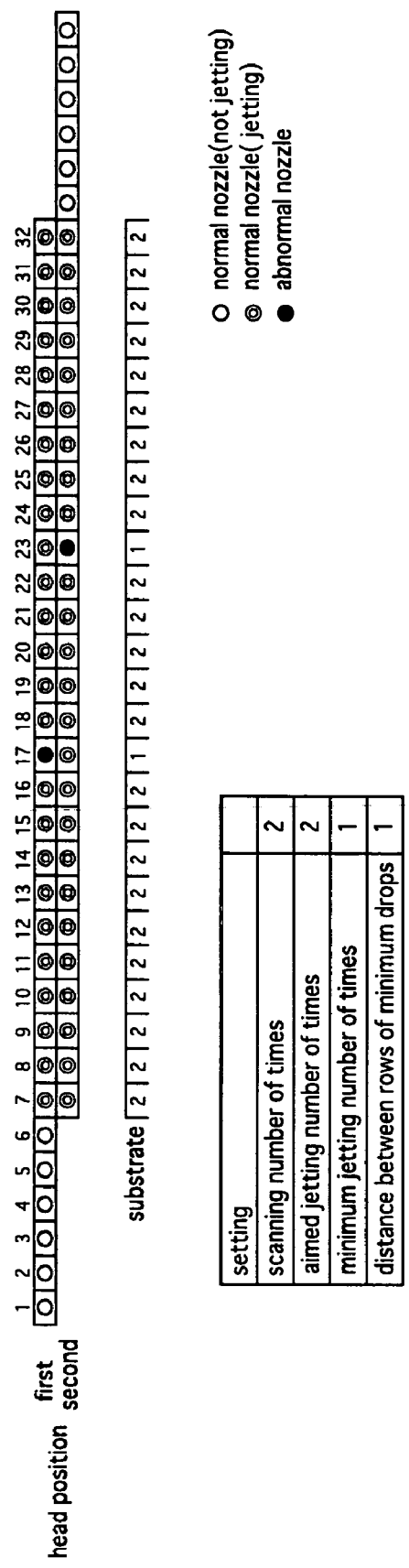
FIG. 11 is a schematic plan view of an ink jetting pattern (No. 1) according to the seventh embodiment of this invention

In the jetting pattern of FIG. 11, the number of rows receiving only one drop is the minimum and the interval between the one drop rows is the maximum.

Figure 12:
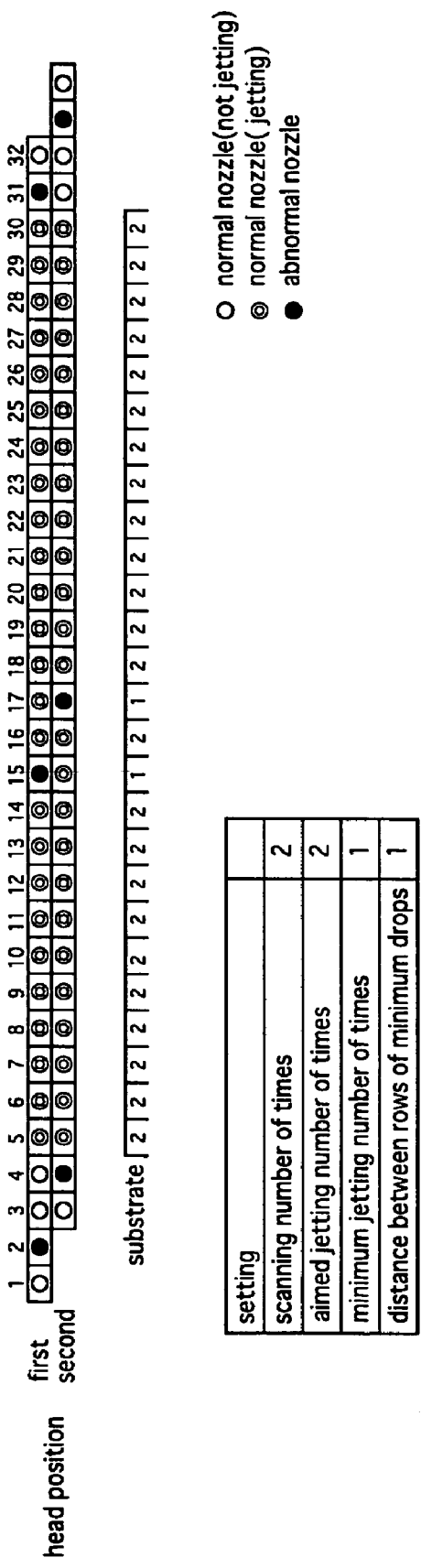
FIG. 12 is a schematic plan view of an ink jetting pattern (No. 2) according to the seventh embodiment of this invention.

In the jetting pattern of FIG. 12, the interval between the one drop rows is shorter than that of the jetting pattern of FIG. 11. However, the number of rows receiving only one drop is smaller than that of the jetting pattern of FIG. 11. The latter is preferentially designed.

Figure 13:
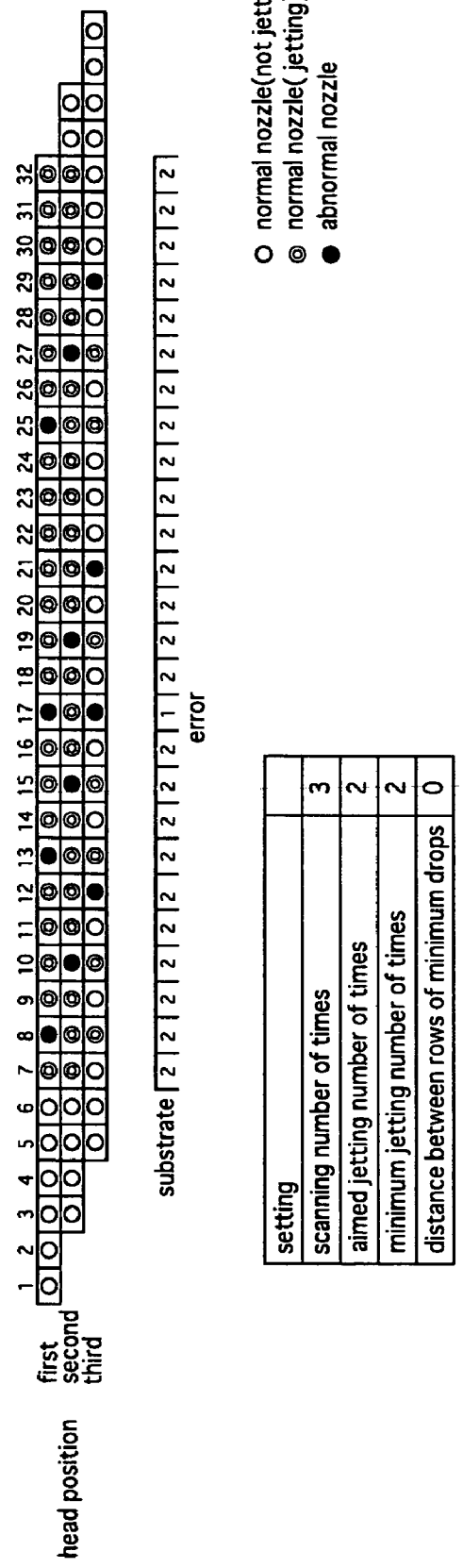
FIG. 13 is a schematic plan view of an ink jetting pattern (No. 3) according to the seventh embodiment of this invention.
Figure 14:
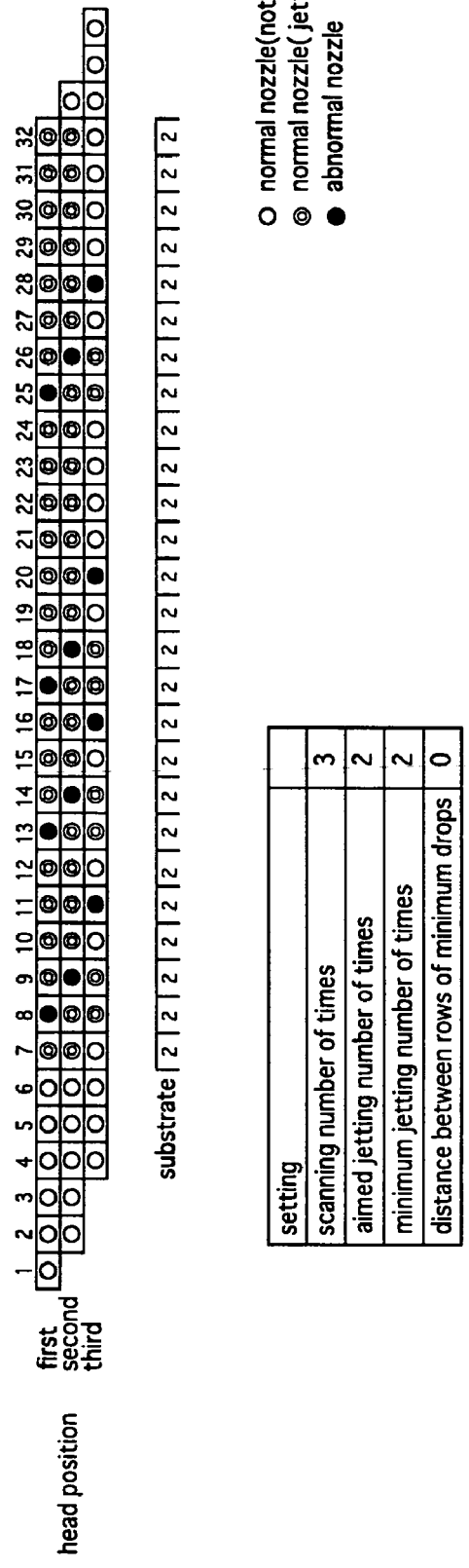
FIG. 14 is a schematic plan view of an ink jetting pattern (No. 4) according to the seventh embodiment of this invention.

In the jetting pattern of FIG. 13, the number of drops jetted onto the spacer forming position of the eleventh row is "one" which is smaller than the predetermined value "2" for the minimum jetting drops. That is an error. In this case, the jetting pattern is remade at step S7. The shift of the ink jet head 3 in the second jetting step and the selection of the driven nozzles are changed from those in the jetting pattern of FIG. 13. Thus, the remade jetting pattern does not make an error. The predetermined conditions are fulfilled.

Figure 15:
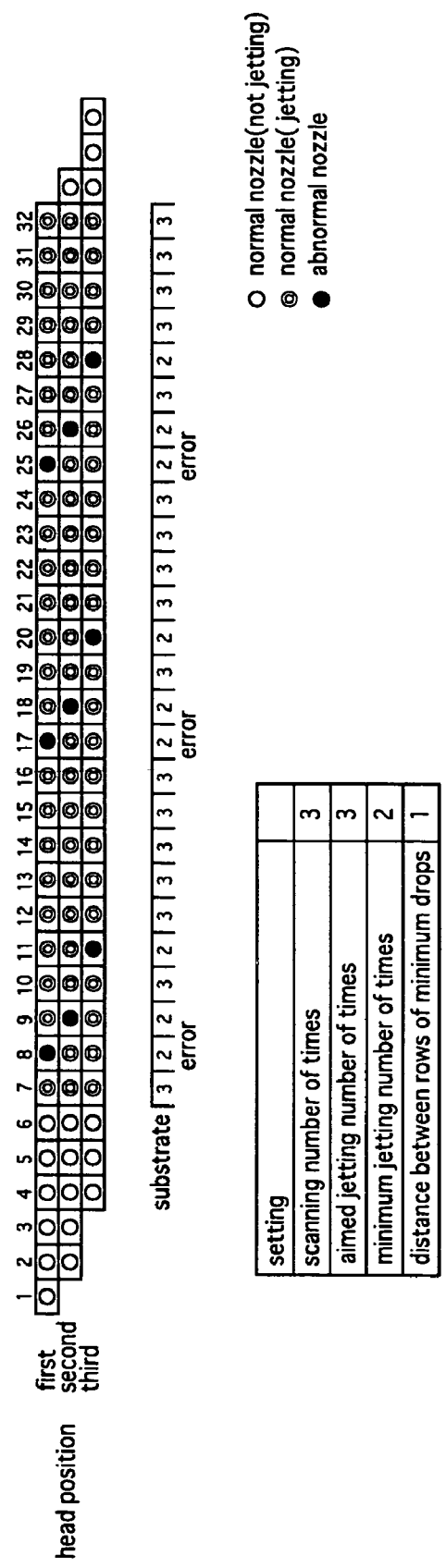
FIG. 15 is a schematic plan view of an ink jetting pattern (No. 5) according to the seventh embodiment of this invention.
Figure 16:
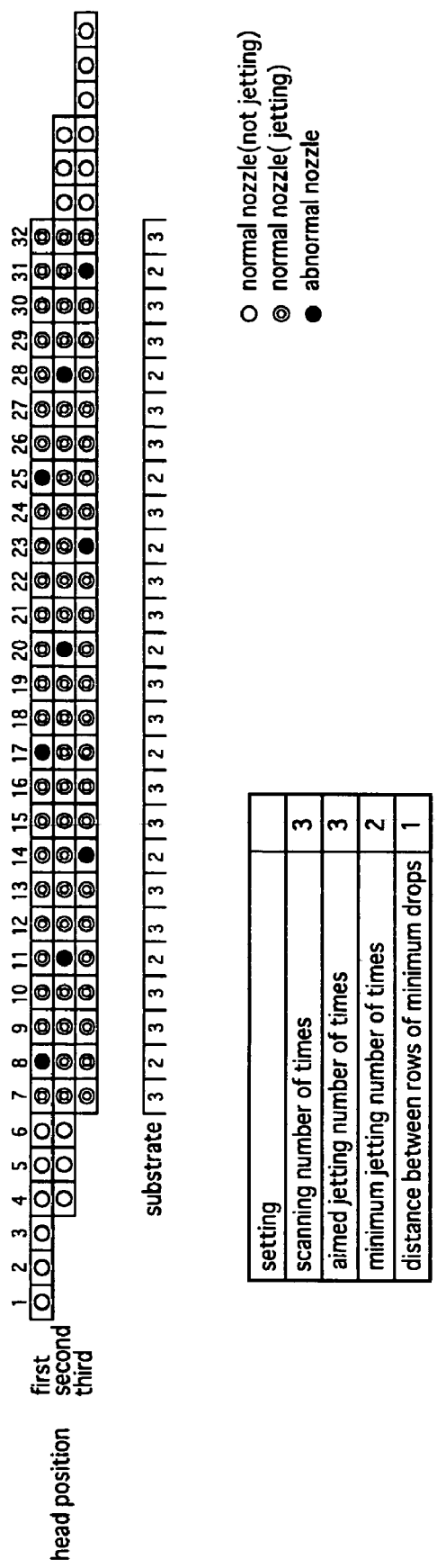
FIG. 16 is a schematic plan view of an ink jetting pattern (No. 6) according to the seventh embodiment of this invention.
Figure 17:
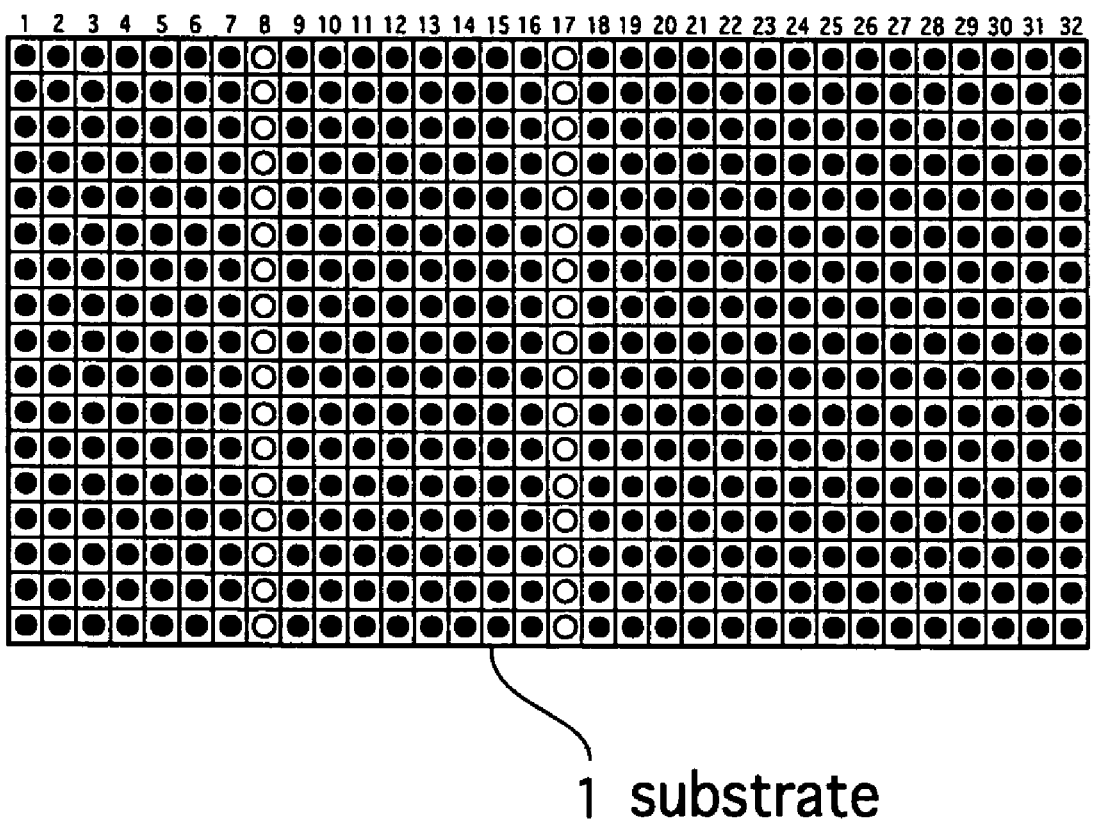
FIG. 17 is a schematic plan view of an ink jetting pattern according to a prior art.

In the jetting pattern of FIG. 15, the rows with two drops (minimum) are adjacent to each other. An "Error" is made. The interval is equal to zero which is smaller than the minimum "1". At step S7, the jetting pattern is remade. The shift of the inkjet head 3 in the second jetting step and the selection of the driven nozzles are changed from those in the jetting pattern of FIG. 13. Thus, the remade jetting pattern does not make errors. The predetermined conditions are fulfilled.

The invention claimed is:

1. In a spacer forming method in which drops of ink with a granular spacer dispersed in solvent is jetted by an inkjetting method utilizing nozzles of an inkjet head onto plural spacer forming positions on one of opposite substrates for maintaining a constant gap to be filled with liquid crystal between said opposite substrates, the spacer forming method including the steps of jetting plural drops onto each of said spacer forming positions, characterized in that the spacer forming method includes:
    a first step of testing whether there are abnormal nozzles in the ink jet head before said ink drops are jetted onto spacer forming positions;
    a second step of jetting said ink drops from normal nozzles only onto the corresponding spacer forming positions; and
    a third step of shifting the corresponding relative lateral position of said nozzles and said spacer forming positions whereby the normal nozzles register with the spacer forming positions which previously registered with the abnormal nozzles.

2. A spacer forming method according to claim 1 in which said drops of ink are deposited onto crossing portions of a non-pixel lattice, and pixels are positioned in openings of said lattice.

3. A spacer forming method according to claim 1 in which said drops of ink are jetted onto said spacer forming positions from plural nozzles of the ink jet head and the corresponding relative lateral position between each nozzle and a respective spacer forming position is so changed that plural drops are not consequently jetted from the same nozzle onto the same spacer forming positions.

4. A spacer forming method according to claim 1 in which said drops of ink are jetted onto said spacer forming positions from plural nozzles of the ink jet head and the corresponding relative lateral position between the nozzle and a respective spacer forming position is so changed that plural drops are jetted from different ones of said nozzles onto the same spacer forming position.

5. A spacer forming method according to claim 1 in which the testing is judged by ink jetting speed of the nozzles of the ink jet head.

6. A spacer forming method according to claim 1 in which the testing is judged by observing ink jetting shift to a drop position of the nozzle form a predetermined position.

7. A spacer forming method according to claim 6 in which said ink jetting shift is represented by $D \times \tan\theta$ where D represents the length of the line connecting the center of the nozzle and the center of the spacer forming positions and $\theta$ represents an angle of said line to the jetting direction of the jetting ink.

8. A spacer forming method according to claim 6 in which said shift is represented as $Vs \times D/Vd$, where D is the length of the line connecting the center of the nozzle and the center of the corresponding spacer forming positions, Vs is a relative moving speed of the nozzle and the substrate, and Vd is the jetting speed of the ink from the nozzle.

9. In a spacer forming apparatus wherein ink with a granular spacer dispersed in solvent is jetted onto plural spacer forming positions from nozzles of an ink jet head on one of opposite substrates for maintaining a constant gap to be filled with liquid crystal, between said opposite substrates, the spacer forming apparatus characterized in that it comprises:
    ink jetting observing means for observing ink jetting of said nozzle;
    abnormal nozzle judgment means for judging an abnormal jetting nozzle on the basis of the observation result of said jetting observing means; and
    a control means whereby ink is not jetted from the abnormal nozzle and ink is jetted from normal nozzles onto spacer forming positions, wherein the relative corresponding positions between the nozzle and spacer forming positions are shifted so that the spacer forming positions registered with the abnormal nozzle is made to register with the normal nozzle and ink isjetted onto the spacer forming positions form the normal nozzle.

10. In a spacer forming method in which ink with a granular spacer dispersed in solvent is jetted onto plural spacer forming positions from nozzles of an ink jet head, on one of opposite substrates for maintaining a constant gap, to be filled with liquid crystal, between said opposite substrates, the spacer forming method characterized in that it comprises:
    a first step of testing whether or not there is one or more abnormal nozzles in the ink jet head before said ink is jetted onto spacer forming positions;
    a second step of jetting ink from normal nozzles and not jetting ink from abnormal nozzles onto the corresponding spacer forming positions; and
    a third step of shifting the corresponding relative position of said nozzle and said spacer forming positions and thereby making a normal nozzle registered with the spacer forming positions which formerly registered with an abnormal nozzle in said second step ofjetting ink onto said spacer forming positions from said normal nozzles.

* * * * *